United States Patent
Englbrecht et al.

(10) Patent No.: US 9,085,277 B2
(45) Date of Patent: Jul. 21, 2015

(54) ACTUATOR ASSEMBLY FOR AN AIRBAG MODULE IN A VEHICLE SAFETY SYSTEM, AIRBAG MODULE, VEHICLE SAFETY SYSTEM AND MANUFACTURING METHOD

(71) Applicant: TRW Airbag Systems GmbH, Aschau am Inn (DE)

(72) Inventors: Karl Englbrecht, Erharting (DE); Desiree Koller, Neumarkt St. Veit (DE); Martin Sedlmeier, Gangkofen (DE); Ingo Treiber, Steinhoring (DE)

(73) Assignee: TRW AIRBAG SYSTEMS GMBH, Aschau Am Inn (DE)

( * ) Notice: Subject to any disclaimer, the term of this patent is extended or adjusted under 35 U.S.C. 154(b) by 0 days.

(21) Appl. No.: 14/261,814

(22) Filed: Apr. 25, 2014

(65) Prior Publication Data
US 2014/0339799 A1 Nov. 20, 2014

(30) Foreign Application Priority Data
May 15, 2013 (DE) .......................... 10 2013 008 285

(51) Int. Cl.
| | | |
|---|---|---|
| *B60R 21/201* | (2011.01) | |
| *B60R 21/2165* | (2011.01) | |
| *B60R 21/2338* | (2011.01) | |
| *B60R 21/215* | (2011.01) | |

(52) U.S. Cl.
CPC ........... *B60R 21/201* (2013.01); *B60R 21/2165* (2013.01); *B60R 21/2338* (2013.01); *B60R 2021/21506* (2013.01); *B60R 2021/21654* (2013.01); *B60R 2021/23384* (2013.01); *B60R 2021/23388* (2013.01)

(58) Field of Classification Search
USPC ............................ 280/736, 740, 743.1, 743.2
See application file for complete search history.

(56) References Cited

U.S. PATENT DOCUMENTS

| | | | | |
|---|---|---|---|---|
| 6,454,300 | B1 * | 9/2002 | Dunkle et al. ................ | 280/742 |
| 7,591,482 | B2 * | 9/2009 | Thomas et al. ............... | 280/739 |
| 7,690,683 | B2 * | 4/2010 | Parks et al. ................. | 280/743.2 |
| 2004/0012180 | A1 * | 1/2004 | Hawthorn et al. ........... | 280/739 |
| 2007/0187935 | A1 | 8/2007 | Thomas et al. | |
| 2010/0187797 | A1 | 7/2010 | Debler et al. | |
| 2014/0008901 | A1 | 1/2014 | Kranzle et al. | |
| 2014/0016990 | A1 | 1/2014 | Weber | |

FOREIGN PATENT DOCUMENTS

| | | |
|---|---|---|
| DE | 102007007360 | 9/2007 |
| DE | 102008028921 | 12/2009 |
| DE | 102009005771 | 7/2010 |
| DE | 102011014869 | 9/2012 |
| EP | 1683690 | 7/2006 |

* cited by examiner

*Primary Examiner* — Faye M Fleming
(74) *Attorney, Agent, or Firm* — Tarolli, Sundheim, Coveil & Tummino LLP

(57) ABSTRACT

The invention relates to an actuator assembly for an airbag module in a vehicle safety system comprising an actuator (10) and a tensioning means (20), wherein the actuator (10) includes a release member (12) which in the idle state of the actuator is connected to a retaining member (11) and is separable from the retaining member (11) by actuating a pyrotechnical ignition unit of the actuator (10) along a predetermined breaking point (13) so as to release a loop (23) of a tensioning means (20). The invention excels by the fact that the loop (23) is formed between two tensioning means portions (21, 22) which are interconnected directly at the predetermined breaking point (13) by a connecting means (30) such that the loop (23) is tensioned around the predetermined breaking point (13) in a self-fixing manner. Furthermore the invention relates to an airbag module, a vehicle safety system and a manufacturing method.

11 Claims, 3 Drawing Sheets

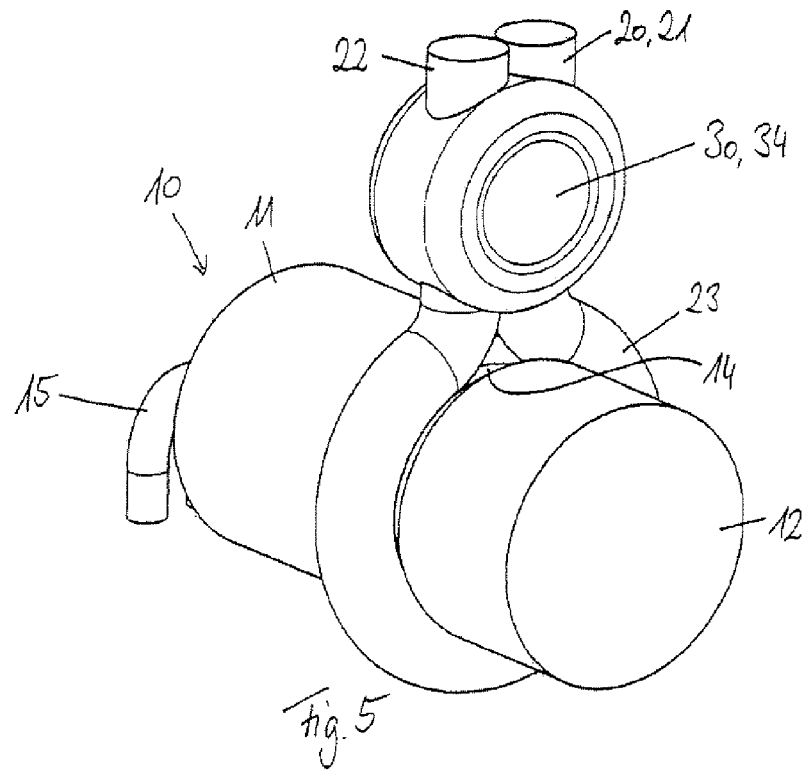
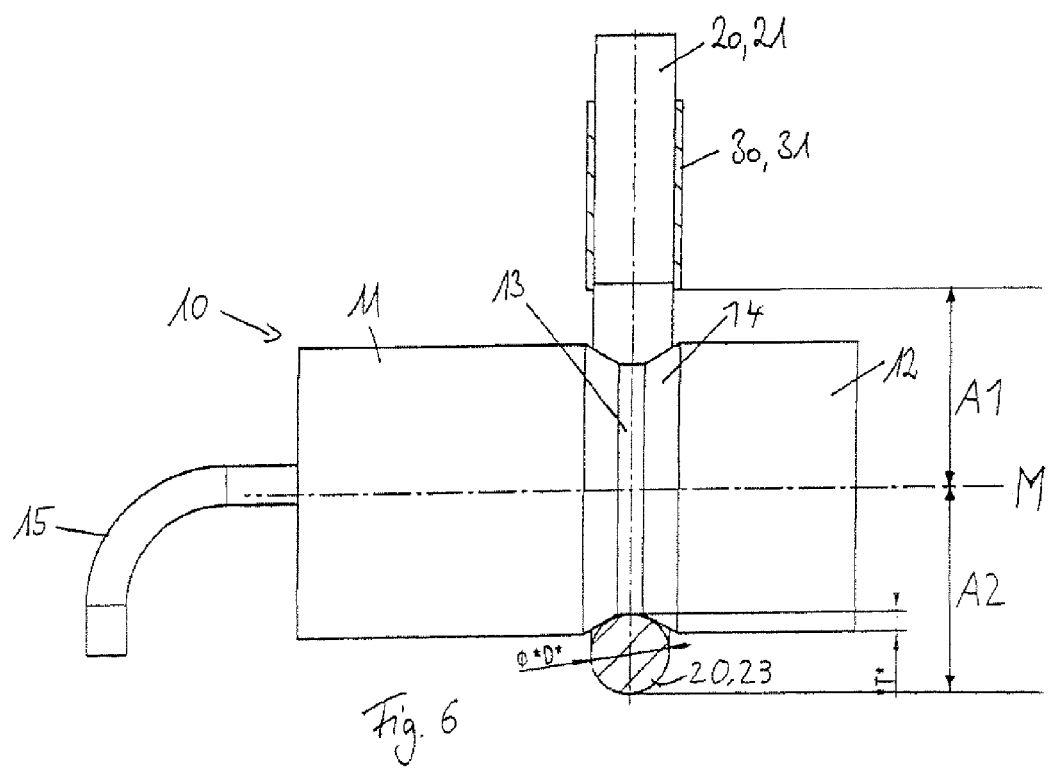

ACTUATOR ASSEMBLY FOR AN AIRBAG MODULE IN A VEHICLE SAFETY SYSTEM, AIRBAG MODULE, VEHICLE SAFETY SYSTEM AND MANUFACTURING METHOD

BACKGROUND OF THE INVENTION

The invention relates to an actuator assembly for an airbag module in a vehicle safety system. Furthermore, the invention relates to an airbag module and a vehicle safety system comprising such actuator assembly as well as a manufacturing method. An actuator assembly according to the preamble of claim 1 is known, for example, from EP 1 683 690 A1.

The actuator assembly known from EP 1 683 690 A1 (especially FIG. 17) comprises an actuator in the form of an explosive stud fastened at a housing of an inflator. A loop formed by a cord is laid around the actuator and is part of a retaining means adapted to be actively released upon a signal. Those retaining means or so called tethers are required to control vent holes of an inflatable airbag.

In practice, tethers are frequently tensioned transversely or obliquely across an airbag. The tether therefore does not basically act perpendicularly to the longitudinal axis of the actuator. This may entail the drawback that the tether can easily be displaced inadvertently along the longitudinal axis of the actuator or can slip off the actuator, before the ignition unit of the actuator has being triggered as specified.

In order to prevent the loop from slipping along the actuator and in this way the release of the loop from being obstructed when the actuator is activated, EP 1 683 690 A1 teaches to provide a clamping means for the cord or the loop. The clamping means is configured in the form of an ignition tablet plug independent of the actuator assembly. When the actuator assembly is mounted, the clamping means is plugged in the vicinity of the loop into the inflator, after the loop has been laid around the actuator, so that the clamping means is in form closure with the actuator, thereby the loop being virtually clamped.

SUMMARY OF THE INVENTION

It is the object of the invention to state an actuator assembly for an airbag module in a vehicle safety system which ensures reliable operation and has a simple structure with compact dimensions. Furthermore, it is the object of the invention to provide an airbag module for a vehicle safety system comprising such actuator assembly, a vehicle safety system comprising such airbag module and/or such actuator assembly as well as a manufacturing method.

According to the invention, this object is achieved with respect to the actuator assembly by the subject matter of claim 1, with respect to the airbag module by the subject matter of claim 7, with respect to the vehicle safety system by the subject matter of claim 9 and with respect to the manufacturing method by the subject matter of claim 11.

The invention is based on the idea to state an actuator assembly for an airbag module in a vehicle safety system comprising an actuator and a tensioning means, the actuator including a release member which in the idle state of the actuator is connected to a retaining member and is separable from the retaining member by activation of a pyrotechnic ignition unit of the actuator along a predetermined breaking point so as to release a loop of a tensioning means. According to the invention, the loop is formed between two tensioning means portions which are interconnected directly at the predetermined breaking point by a connecting means such that the loop is tensioned around the predetermined breaking point in a self-fixing manner. The term "idle state of the actuator" has to be understood in this context so that the actuator was not yet activated as specified, i.e. is provided in a home position in which no situation for release of the tensile means is given yet which might trigger activation of the actuator. The term "activation of the pyrotechnical ignition unit" is to be understood so that the pyrotechnical ignition unit is ignited by an, especially electric, signal which starts up the activation of the actuator.

The loop tensioned around the predetermined breaking point in a self-fixing manner ensures that the tensioning means remains in the area of the predetermined breaking point at the actuator. Thus it is sufficient to merely provide a flat notch in the area of the predetermined breaking point which retains the loop in its position. It is provided for this purpose that immediately or directly at the predetermined breaking point a connecting means is provided for interconnecting the two tensioning means portions delimiting the loop of the tensioning means along the tensioning means. The connecting means is arranged so closely to the predetermined breaking point that the loop is tensioned around the predetermined breaking point in a self-fixing manner and free from play, respectively. Thus the loop is fixed in the axial direction of the retaining member or release member, resp., substantially via the frictional force between the actuator and the tensioning means. Therefore, the loop is frictionally fixed in the axial direction of the actuator. This results advantageously in the fact that the wall thickness of the actuator can be reduced. The actuator assembly according to the invention therefore has especially small outer dimensions. Moreover, in the invention compared to the afore-mentioned EP 1 683 690 A1 a costly clamping device requiring large space in the form of an ignition tablet plug to be separately mounted at an inflator can be dispensed with. Rather, the invention states a simple solution including a connecting means which is solely engaged in the loop itself formed between two tensioning means portions, thereby the loop being tensioned in a self-fixing manner, virtually in itself.

According to a preferred embodiment of the actuator assembly according to the invention, the loop is preformed, especially prefixed by the connecting means. In this case the loop is already existing or already formed, before the tensioning means is connected to the actuator during manufacture of the actuator assembly. Advantageously, the loop has an, especially natural, diameter which is smaller than the diameter of the actuator in the area of the predetermined breaking point. This ensures that after connecting the loop to the actuator, there is a frictional force between the actuator and the predetermined breaking point, resp., and the loop, said frictional force securing the loop in the axial direction of the actuator.

In this case the tensile means forming the loop is further preferred to be elastic so that the loop can be elastically expanded. Hence the actuator can be inserted in the loop and the loop can automatically tighten around the actuator. For forming a pre-fabricated loop the connecting means is designed at the two tensioning means portions preferably as seam, clip, especially stapler clip or metallic clip, shrink hose and/or seal. In other words, the loop can be formed between tensioning means portions which are interconnected in a fixed, especially non-detachable or not non-destructively detachable manner. In this way, it is additionally ensured that the loop is held to be closely adjacent around the actuator in the long run.

Basically different connecting means can be employed. For example, the connecting means can be a seam. The tensioning means portions thus can be sewn directly in the area of the predetermined breaking point so as to form a closely adjacent loop between them.

A similar effect can be achieved by a clip. The clip can be a stapler clip or generally a metallic clip and can encompass or reach through the tensioning means portions. Especially the tensioning means portions can be stapled together so that the clip extends through the tensioning means portions and fixes the latter to each other.

Furthermore, for fixing the tensioning means portions a seal can be provided which prevents destruction-free opening of the loop. The seal can completely enclose the areas of the tensioning means portions at which it is arranged.

Another embodiment of the invention provides that when manufacturing the actuator assembly the loop is formed or fixed only after looping or winding the tensioning means around the actuator. The actuator assembly thus can have a postfixed loop, i.e. the loop is postfixed by the connecting means. The connecting means can be especially in the form of a cable tie or an adhesive tape for forming a postfixed loop. A postfixed loop can also be realized by a connecting means in the form of a clip or seal. In general, for forming a postfixed loop the connecting means is adapted to encompass the tensioning means portions, especially to be laid around the tensioning means portions or to reach through the same, when the tensioning means portions are arranged in parallel to each other.

The connecting means can also be a shrink hose or an, especially elastic, O-ring. By such connecting means a combined preformed and postfixed loop can be formed. It is especially provided that although the loop is formed by slipping on the shrink hose or the O-ring already before connection to the actuator, it is initially variable as regards the loop diameter, however. Only after the loop is laid around the predetermined breaking point of the actuator and is tensioned free from play, is the loop or the diameter of the loop, resp., fixed by the connecting means. When using a shrink hose, it can be moved tightly toward the predetermined breaking point and can subsequently be heated so that the loop contracts tightly around the actuator and the predetermined breaking point, respectively. When using an O-ring, the elasticity thereof causes the pretensioning force which permits tightly enclosing the actuator with the tensioning means or the loop, respectively.

Preferably the tensioning means includes an elastic material at least in the area of the loop so that the loop can be expanded, especially temporarily radially extended for mounting on the predetermined breaking point. This applies in particular to embodiments including a prefixed loop or a tight connection of the tensioning means portions. In general, an elastic design of the tensioning means, at least in the area of the loop, is useful for all embodiments. The actuator can be inserted in the loop so that the loop is positioned in the area of the predetermined breaking point. As soon as the force extending the loop subsides, the loop contracts around the actuator and thus is automatically fixed. It is especially provided in this context that in the relaxed, i.e. non-mounted, state the loop has a smaller cross-sectional diameter, especially measured at the radial inside of the loop cross-section, than the predetermined breaking point.

Furthermore, the ratio of the first distance, measured between the longitudinal axis of the actuator assembly and the connecting means, from a second distance, measured between the longitudinal axis and the outer diameter of the loop, amounts to a value of up to 1.3, especially up to 1.2, especially up to 1.1, especially up to 1.0, further especially up to 0.9. Inadvertent displacement of the loop along the actuator can be realized by positioning the connecting means as closely as possible to the loop, i.e. closely to the outer diameter of the loop. As regards optimum positioning, appropriate tests have resulted in the afore-mentioned setting ratios, i.e. the ratio of the first distance from the second distance. In other words, a sufficiently good self-fixing of the loop is still reached when the first distance is up to 30% larger than the second distance (ratio value of up to 1.3). It is also possible that the connecting means is positioned so far in the direction of the longitudinal axis of the actuator assembly that the first distance is smaller than the second distance, i.e. the connecting means virtually covers an area of the outer loop diameter (ratio value of up to 0.9).

According to an independent aspect, the invention is based on the idea to state an airbag module for a vehicle safety system comprising an airbag, an inflator and an afore-described actuator assembly. The afore-mentioned actuator assembly is especially suited for use in an airbag module.

In a preferred configuration of the airbag module according to the invention, it is provided that the tensioning means is connected to the airbag. In particular, the tensioning means can be fastened to an inner wall and/or an outer wall of the airbag. The tensioning means thus can be used in combination with the actuator to vary the volume of the airbag as needed. For example, the tensioning means can be connected to venting flaps so that gas can escape from the airbag by activating the actuator unit and releasing the tensioning means. The tensioning means can also be connected to the inner wall of the airbag so that the airbag can expand to a larger volume by release of the tensioning means after activation of the actuator.

Another independent aspect of the invention relates to a vehicle safety system comprising an afore-described airbag module and/or an afore-described actuator assembly. In the vehicle safety system preferably an electric trigger unit is provided which is signal-connected to the actuator assembly so that an electric trigger pulse can be transmitted to the ignition unit. Further, the vehicle safety system according to the invention can have at least one sensor for detecting vehicle movement data which is connected to the trigger unit. The trigger unit can be adapted to the actuator assembly, especially the ignition unit, for transmitting the electric trigger pulse as a function of the measured vehicle movement data.

Furthermore, within the scope of the application a method for manufacturing an afore-described actuator assembly and/or an afore-described airbag module and/or an afore-described vehicle safety system is disclosed and claimed in which the tensioning means is laid around the predetermined breaking point so as to form the loop. Subsequently, the tensioning means portions are interconnected in the area of the predetermined breaking point so that the loop tightens around the predetermined breaking point in a self-fixing manner. Alternatively, the tensioning means includes an elastic loop through which the release member of the actuator assembly is passed so that the loop is positioned at the predetermined breaking point and contracts around the predetermined breaking point in a self-fixing manner.

BRIEF DESCRIPTION OF THE DRAWINGS

Hereinafter the invention shall be illustrated in detail by way of embodiments with reference to the enclosed schematic figures, in which:

FIG. 5 shows a perspective view of an actuator assembly of the invention according to another preferred embodiment, wherein the loop is fixed by a seal as connecting means; and FIG. 6 shows a longitudinal sectional view of an actuator assembly of the invention according to a preferred embodiment, wherein the relation between the diameter of the tensioning means and the groove depth is visible at the predetermined breaking point of the actuator.

DESCRIPTION OF EMBODIMENTS

Figure 2:
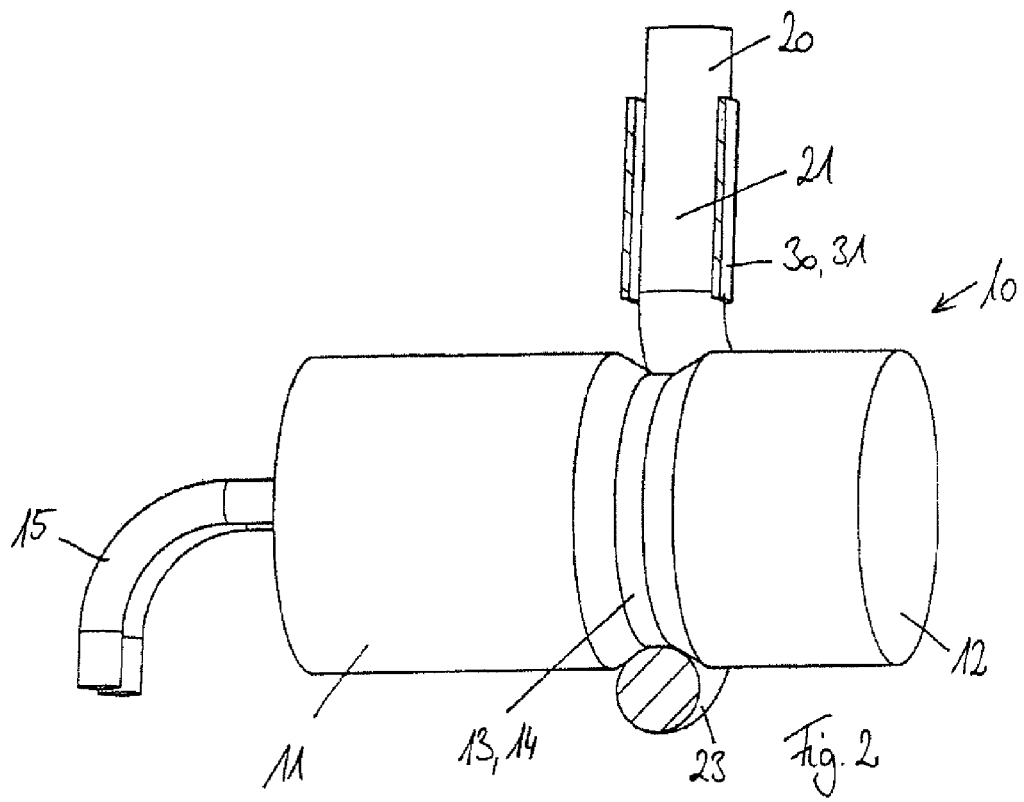
FIG. 2 shows a partly cut view of the actuator assembly according to FIG. 1.

Each of the following embodiments shows an actuator assembly comprising an actuator 10 including a pyrotechnic ignition unit. The pyrotechnic ignition unit is connectable or connected to a trigger unit not shown via an electric connection 15. The actuator 10 is formed of a retaining member 11 and a release member 12 which are interconnected. Especially, the retaining member 11 and the release member 12 can be coupled in one part. Between the retaining member 11 and the release member 12 a predetermined breaking point 13 is arranged which is preferably in the form of a groove 14. By activating the pyrotechnic ignition unit the release member 12 can be blasted off the retaining member 11, wherein the actuator 10 is separated at the predetermined breaking point 13.

A tensioning means 20 which is part of the actuator assembly is arranged around the actuator 10 in the area of the predetermined breaking point 13. The tensioning means 20 can be a rope, a cord or a tether, for example. The tensioning means 20 comprises or forms a loop 23 which is wound or guided around the actuator 10. The loop 23 extends in a groove 14 forming the predetermined breaking point 13. By separating the release member 12 from the retaining member 11 the loop 23 can be released. In this way a one-sided fixation of the tensioning means 20 can be undone.

In order to minimize the dimensions of the actuator 10 it is preferred when the groove 14 has a small groove depth. In order to guarantee nevertheless that the loop 23 is retained in the area of the predetermined breaking point 13, especially does not laterally slip and cannot be inadvertently displaced along the longitudinal axis M of the actuator, it is provided that the loop is tensioned around the predetermined breaking point 13 in a self-fixing manner, preferably free from play.

The loop 23 is formed in that two tensioning means portions 21, 22 are interconnected immediately at the predetermined breaking point 13 by a connecting means 30. The connecting means 30 is arranged so closely at the predetermined breaking point 13 that the loop 23 tightens closely and substantially free from play around the actuator 10, especially around the predetermined breaking point 13. For this purpose different connecting means 30 can be used.

By the term "immediately" in accordance with the invention it is understood that the loop 23 is laid around the substantially circular ring-shaped predetermined breaking point 13 or groove 14 so tightly that it has equally a substantially circular ring-shaped form. The inner diameter of the loop 23 is thus smaller than the outer diameter of the retaining member 11 and the release member 12, respectively.

Figure 1:
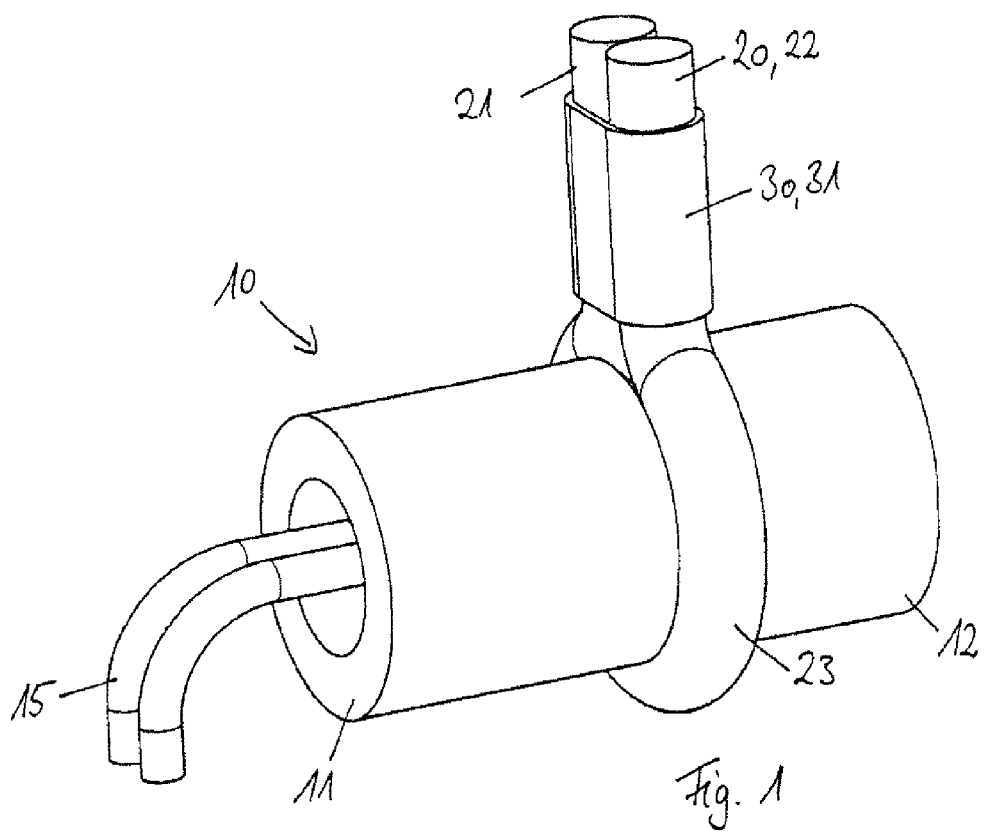
FIG. 1 shows a perspective view of the actuator assembly of the invention according to a preferred embodiment, wherein the loop is fixed by a shrink hose as connecting means.

FIG. 1 shows an embodiment in which the tensioning means portions 21, 22 are interconnected by a shrink hose 31. The shrink hose 31 can be slipped over the tensioning means portions 21, 22 with the loop 23 prior to wrapping the actuator 10. After that, the actuator 10 is inserted in the loop 23 formed in this way and is positioned in the area of the loop 23 with its predetermined breaking point 13. Then the shrink hose 31 is guided closely to the predetermined breaking point 13 and is heated so that the shrink hose 31 contracts. Consequently also the loop 23 contracts and encloses the predetermined breaking point 13 in a self-fixing manner and free from play. Especially the loop 23 is pulled into the groove 14 which can be comparatively small, especially having a small depth. The groove 14 primarily, especially exclusively, serves for determining the position of the loop 23. The loop 23 is axially secured by the frictional connection between the loop 23 and the predetermined breaking point 13 resulting from the pretension exerted by the loop 23.

In the partly cut view according to FIG. 2 the close positioning of the loop 23 in the groove 14, i.e. in the area of the predetermined breaking point 13, is clearly visible. It is also evident that the distance between the connecting means 30 and the groove 14 and the groove bottom, respectively, corresponds approximately to the diameter D of the tensioning means 20. As described already in the foregoing, it is equally expressed hereby that the two tensioning means portions 21, 22 are interconnected by the connecting means 30 immediately at the predetermined breaking point 13. It is ensured in this way that the loop 23 is tensioned around the actuator 10 free from play.

Figure 3:
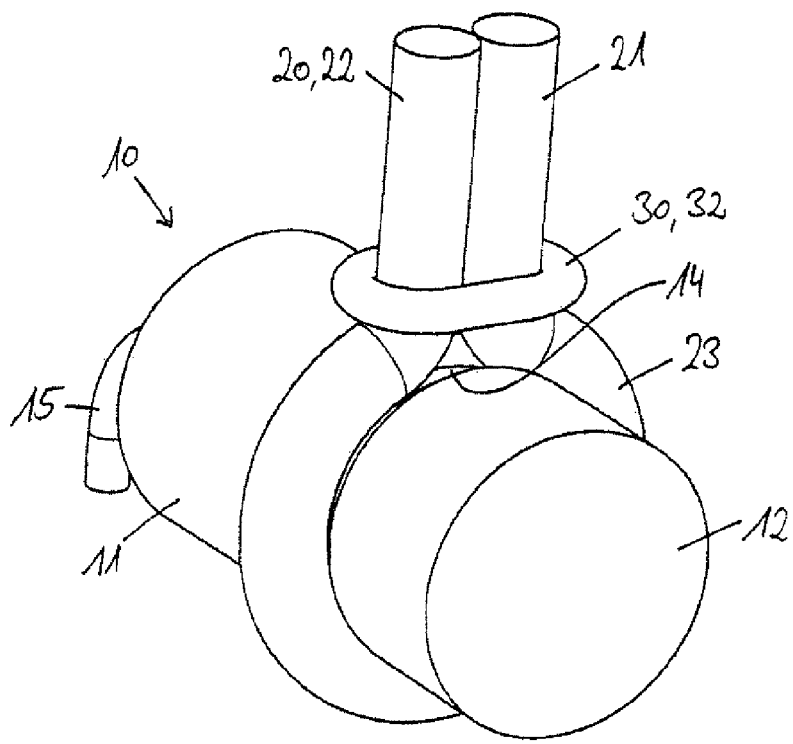
FIG. 3 is a perspective view of an actuator assembly according to the invention in accordance with another preferred embodiment, wherein the loop is fixed by an O-ring as connecting means.

An alternative connecting means 30 is shown in FIG. 3. The tensioning means portions 21, 22 are connected to an O-ring 32 in this embodiment. The O-ring 32 can initially be slipped over the tensioning means portions 21, 22 similarly to a shrink hose 31, before the actuator 10 is subsequently inserted in the loop 23. The O-ring 32 then is guided or rolled closely to the predetermined breaking point 13 or groove 14, wherein the O-ring 32 tightly contracts the tensioning means portions 21, 22 due to its elasticity. As a consequence, also the loop 23 contracts tightly and is finally adjacent to the predetermined breaking point 13 free from play.

Figure 4:
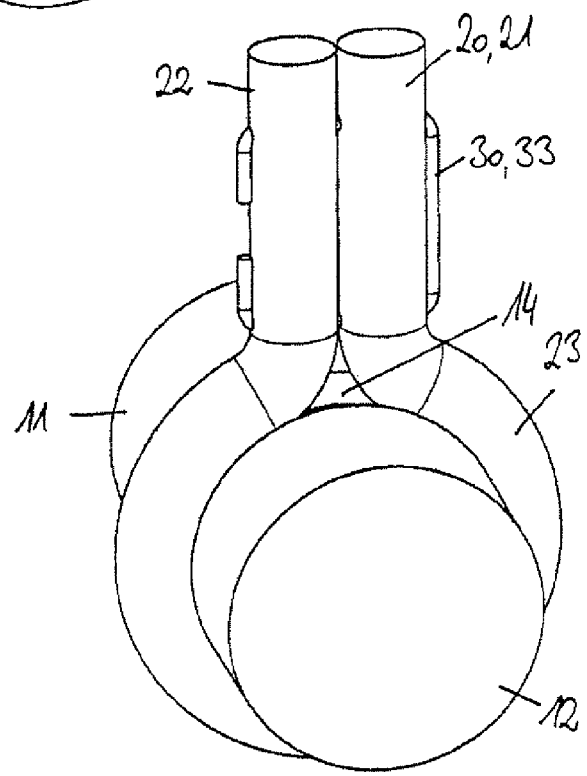
FIG. 4 is an actuator assembly of the invention according to another preferred embodiment, wherein the loop is fixed by a clip as connecting means.

FIG. 4 illustrates another option of fixing the tensioning means portions 21, 22. In this embodiment a clip 33 is used as connecting means 30 which reaches through the first tensioning means portion 21 and the second tensioning means portion 22 and thus fixes the same to each other. The clip 33 can be used for forming a preformed and prefixed loop 23. This means that the clip 33 fixes the tensioning means portions 21, 22 to each other before the actuator 10 is inserted in the loop 23. Thus the diameter of the loop 23 is defined already prior to mounting at the actuator 10. It is advantageous in this case when the tensioning means 20 includes an elastic material at least in the area of the loop 23 so that the loop 23 is elastically expandable for being positioned above the predetermined breaking point 13. As soon as the loop 23 is arranged in the area of the predetermined breaking point 13, the expanding force for the loop 23 is released so that due to its elastic properties the loop 23 contracts in a self-fixing manner, especially free from play, and tightens around the predetermined breaking point 13.

Alternatively, the clip 33 can be set only after the actuator 10 has been inserted in the loop 23. Hence the tensioning means 20 can first be laid or wound around the actuator 10, especially in the area of the predetermined breaking point 13. Subsequently the clip 33 is set, wherein the tensioning means 20 is kept tensioned. The clip 33 in this way fixes the pretensioning force exerted on the loop 23 by the tensioning means 20. The loop 23 is thus frictionally connected to the predetermined breaking point 13 and is frictionally retained in the groove 14, respectively.

Instead of a clip 33 a seal 34 can be used, as is exemplified in FIG. 5. The effect of the seal 34 corresponds to the effect of the clip 33. In this way the seal 34 can be used both for a preformed and prefixed loop 23 and for a postfixed loop 23. It is also possible that a preformed and postfixed loop 23 is formed with the aid of the seal 34. For this purpose the seal 34 can have a through-opening through which the tensioning means portions 21, 22 are guided. In this way, between the tensioning means portions a loop 23 is formed which can be laid around the actuator 10. The seal 34 is compressed so as to fix the tensioning means portions 21, 22 only when the loop 23 is closely adjacent to the predetermined breaking point 13. The preformed loop 23 is thus postfixed.

FIG. 6 illustrates the advantages of the actuator assembly according to the invention. By connecting the connecting means 30 in this manner to the tensioning means portions 21, 22, especially at a distance from the predetermined breaking point 13 which approximately corresponds to the diameter D of the tensioning means 20, a self-fixing frictional connection is obtained between the tensioning means 20 and the actuator 10. This is also applicable especially when the tensioning means 20 acts obliquely on the actuator 10. In this case, too, it is expressed, as described already in the foregoing, that the two tensioning means portions 21, 22 are interconnected directly, in accordance with the invention, at the predetermined breaking point 13 by the connecting means 30.

The frictional connection or the self-fixing support, resp., of the loop 23 in the area of the predetermined breaking point 13 prevents axial slipping or inadvertent displacement of the loop 23. Therefore, in the actuator assembly according to the invention it is sufficient to provide a comparatively small groove depth T. In particular, the groove depth T can be smaller than the cross-sectional radius of the tensioning means 20. In this way the total diameter of the actuator 10 is reduced. Hence the outer dimensions of the actuator 10 are independent of the dimensions of the tensioning means 20. Moreover, in this way the geometry of the actuator 10 is facilitated. As a consequence, the requirements to the tools used for manufacturing the actuator 10 are reduced, which in total reduces the manufacturing costs and the manufacturing efforts.

Furthermore, FIG. 6 shows a longitudinal axis M of the actuator assembly extending through the center of the elongate actuator assembly and in rotationally symmetric actuator assemblies also forming the axis of symmetry thereof. A first distance A1 is measured, starting from the longitudinal axis M to the connecting means 30. A second distance A2 is measured, starting from the longitudinal axis M to the outer diameter of the loop 23. The distances A1 and A2 defined here relate to the completely mounted state of the actuator assembly, as shown in FIG. 6, i.e. after fixing the loop 23 around the predetermined breaking point 13 by means of the connecting means 30.

LIST OF REFERENCE NUMERALS 10 actuator
11 retaining member
12 release member
13 predetermined breaking point
14 groove
15 electric connection
20 tensioning means
21 first tensioning means portion
22 second tensioning means portion
23 loop
30 connecting means
31 shrink hose
32 O-ring
33 clip
34 seal
D diameter of tensioning means
T groove depth
M longitudinal axis
A1 first distance
A2 second distance

The invention claimed is:

1. An actuator assembly for an airbag module in a vehicle safety system comprising an actuator (10) and a tensioning means (20), wherein the actuator (10) includes a release member (12) which in the idle state of the actuator (10) is connected to a retaining member (11) and is separable from the retaining member (11) by actuating a pyrotechnical ignition unit of the actuator (10) along a predetermined breaking point (13) so as to release a loop (23) of a tensioning means (20),
wherein the loop (23) is formed between two tensioning means portions (21, 22) which are interconnected directly at the predetermined breaking point (13) by a connecting means (30) such that the loop (23) is tensioned around the predetermined breaking point (13) in a self-fixing manner.

2. The actuator assembly according to claim 1, wherein the loop (23) is prefixed by the connecting means (30), and/or wherein the loop (23) is postfixed by the connecting means (30).

3. The actuator assembly according to claim 1, wherein the tensioning means (20) includes an elastic material at least in the area of the loop (23) so that the loop (23) is expandable for mounting on the predetermined breaking point (13).

4. The actuator assembly according to claim 1, wherein the connecting means (30) is a shrink hose (31) or an elastic O-ring (32) or a seam or a cable tie or an adhesive tape or a clip (33) or a seal (34).

5. The actuator assembly according to claim 1, wherein the loop (23) has a cross-sectional diameter which in a relaxed state is smaller than the cross-sectional diameter of the predetermined breaking point (13).

6. The actuator assembly according to claim 1, wherein the ratio of a first distance A1, measured between the longitudinal axis M of the actuator assembly and the connecting means (30), from a second distance A2, measured between the longitudinal axis M and the outer diameter of the loop (23), amounts to a value of up to 1.3.

7. An airbag module for a vehicle safety system comprising an airbag, a gas generator and an actuator assembly according to claim 1.

8. The airbag module according to claim 7, wherein the tensioning means (20) is connected to an airbag at an inner wall and/or an outer wall of the airbag.

9. A vehicle safety system comprising an airbag module and/or an actuator assembly according to claim 1, wherein an electric release unit is provided which is signal-connected to the actuator assembly such that an electric trigger pulse can be transmitted to the ignition unit.

10. The vehicle safety system according to claim 9, wherein at least one sensor for detecting vehicle movement data is connected to the trigger unit and the trigger unit transmits the electric trigger pulse as a function of the measured vehicle movement data to the ignition unit.

11. A method for manufacturing an actuator assembly, an airbag module or a vehicle safety system according to claim 1, in which the tensioning means (20) is laid around the predetermined breaking point (13) so as to form the loop (23) and subsequently the tensioning means portions (21, 22) are interconnected in the area of the predetermined breaking point (13) so that the loop (23) tightens around the predetermined breaking point (13) in a self-fixing manner, or in which the tensioning means (20) includes an elastic loop (23) through which the release member (12) is guided such that the loop (23) is positioned at the predetermined breaking point (13) and contracts around the predetermined breaking point (13) in a self-fixing manner.

* * * * *